US008548410B2

(12) United States Patent
Jussila et al.

(10) Patent No.: US 8,548,410 B2
(45) Date of Patent: Oct. 1, 2013

(54) RF FRONT-END FOR INTRA-BAND CARRIER AGGREGATION

(75) Inventors: Jarkko Jussila, Turku (FI); Pete Sivonen, Raisio (FI)

(73) Assignee: St-Ericsson SA, Plan-les-Ouates (CH)

( * ) Notice: Subject to any disclaimer, the term of this patent is extended or adjusted under 35 U.S.C. 154(b) by 42 days.

(21) Appl. No.: 13/307,743

(22) Filed: Nov. 30, 2011

(65) Prior Publication Data

US 2013/0136211 A1 May 30, 2013

(51) Int. Cl.
*H04B 1/18* (2006.01)

(52) U.S. Cl.
USPC .................. 455/189.1; 455/293; 455/338

(58) Field of Classification Search
USPC ............... 455/188.1, 189.1, 190.1, 280, 293, 455/323, 334, 338
See application file for complete search history.

(56) References Cited

U.S. PATENT DOCUMENTS

| 7,286,809 B2 * | 10/2007 | Friesen et al. ............ 455/296 |
| 2003/0086383 A1 | 5/2003 | Bremer et al. |
| 2006/0145762 A1 | 7/2006 | Leete |
| 2009/0257533 A1 | 10/2009 | Lindoff et al. |
| 2010/0007424 A1 | 1/2010 | Savla et al. |
| 2010/0156538 A1 | 6/2010 | Ogasawara |
| 2011/0065403 A1 * | 3/2011 | Muhammad et al. ...... 455/232.1 |
| 2012/0077446 A1 | 3/2012 | Kahrizi et al. |

FOREIGN PATENT DOCUMENTS

WO  0173958 A1  10/2001

OTHER PUBLICATIONS

B. Razavi, "RF Microelectronics," pp. 170-173 and pp. 227-230, Prentice Hall, Inc., USA, 1998.
Asgaran, S., et al., A Novel Gain Boosting Technique for Design of Low Power Narrow-Band RFCMOS LNAs, Analog & Mixed Signal Design, Poster Session IV, 2004, pp. 293-296.
Heiberg, Adam C., et al., A 250 mV, 352 µW GPS Receiver RF Front-End in 130 nm CMOS, IEEE Journal of SolidState Circuits, Apr. 2011, pp. 938-949, vol. 46, No. 4.
Bagheri, Rahim, et al., An 800-MHz-6-GHz Software-Defined Wireless Receiver in 90-nm CMOS, IEEE Journal of Solid-State Circuits, Dec. 2006, pp. 2860-2876, vol. 41, No. 12.
Ru, Zhiyu, et al., Digitally Enhanced Software-Defined Radio Receiver Robust to Out-of-Band Interference, IEEE Journal of Solid-State Circuits, Dec. 2009, pp. 3359-3375, vol. 44, No. 12.

* cited by examiner

*Primary Examiner* — Nguyen Vo
(74) *Attorney, Agent, or Firm* — Coats & Bennett, P.L.L.C.

(57) ABSTRACT

The method and apparatus described herein address problems associated with conventional wireless receivers configured for intra-band carrier aggregation. The disclosed solution applies the received signal to a single front-end amplifier, which may comprise a low-noise amplifier, and divides the amplified signal into two or more processing paths, where each path is associated with a different local oscillator frequency corresponding to a different reception band. To compensate for the impact of the additional processing paths on the amplifier performance, a negative resistor unit applies a negative resistance to the output of the front-end amplifier when two or more processing paths are active.

33 Claims, 6 Drawing Sheets

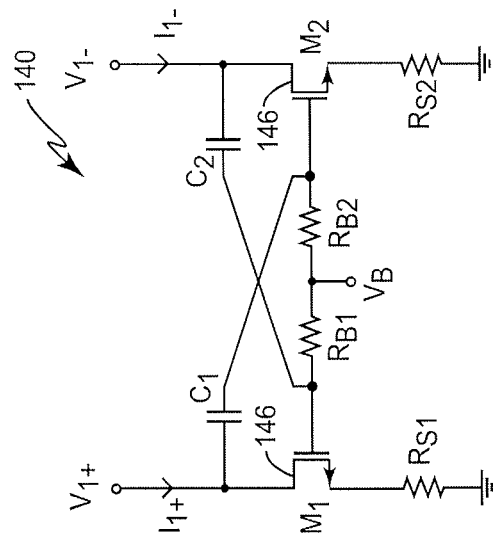
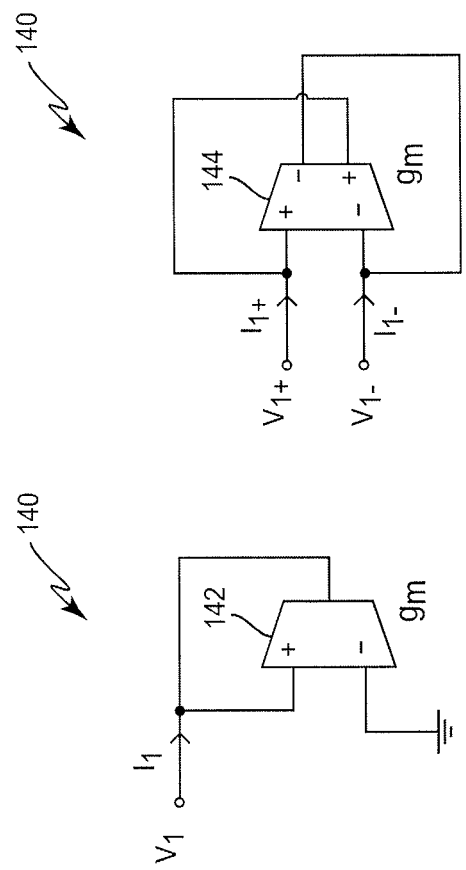
*FIG. 5C*
*FIG. 5B*
*FIG. 5A*

RF FRONT-END FOR INTRA-BAND CARRIER AGGREGATION

The invention disclosed herein generally relates to intra-band carrier aggregation for wireless receivers, and more particularly to wireless receivers capable of selectively switching between contiguous intra-band carrier aggregation and non-contiguous intra-band carrier aggregation.

BACKGROUND

Traditionally, cellular handset radio receivers are designed to receive a signal modulated to a single carrier frequency. For example, the radio receiver may comprise a direct-conversion receiver, where an analog and digital baseband signal processing circuit downconverts the input signal to I and Q baseband signals using two local oscillator (LO) signals, $f_{LO,I}$ and $f_{LO,Q}$, respectively. Both $f_{LO,I}$ and $f_{LO,Q}$ have the same frequency, which is equal to the carrier frequency of the input signal, and a 90° phase difference, which prevents loss of the received information during processing. The analog and digital baseband signal processing circuit further processes the downconverted I and Q signals with analog and digital baseband circuits to retrieve the wanted signal.

If the wanted signal contains several adjacent frequency channels, they can in principle be processed with a single radio receiver having a single front-end amplifier connected to I and Q downconversion mixers followed by a single analog and digital baseband I/Q signal processing circuit as long as the total bandwidth of the wanted signal does not exceed the bandwidth of the receiver. For example, if the wanted signal contains N frequency channels, and the bandwidth of one channel is $f_{BW}$, the total bandwidth of the wanted signal may be represented by $Nf_{BW}$. To minimize the bandwidth used in baseband/IF signal processing, and therefore to minimize power dissipation of the wireless receiver, the LO signal used to generate $f_{LO,I}$ and $f_{LO,Q}$ should be placed in the middle of the received signal band. The bandwidth of the downconverted wanted signal then becomes $Nf_{BW}/2$. If the wanted signal contains an even number of channels, each having the same bandwidth, the LO signal can be placed between two adjacent channels and all channels are processed as in a low-IF receiver. If the wanted signal contains an odd number of received adjacent channels, each having the same bandwidth, the LO signal should have a frequency equal to the center frequency of one of the channels, where this channel would be processed like in a direct-conversion receiver and the other channels would be processed as in a low-IF counterpart receiver.

Carrier aggregation refers to the simultaneous wireless reception of several signal channels associated with different frequencies in Long Term Evolution (LTE) wireless systems. A similar situation existing in Global System for Mobile communications (GSM) and High-Speed Downlink Packet Access (HSDPA) systems is generally referred to using the terms dual carrier or multi-carrier. While the term "carrier aggregation" is generally used herein, it will be appreciated that the following also applies to dual-carrier and multi-carrier systems.

Inter-band carrier aggregation refers to carrier aggregation where the wanted signal channels are in different reception bands. In practice, an off-chip passive radio frequency (RF) bandpass filter is used before the receiver integrated circuit (IC) to attenuate potential out-of-band blocking signals to levels that the receiver IC can tolerate. For inter-band carrier aggregation, a separate off-chip RF filter is needed for each reception band, where each filter is usually followed by a dedicated low-noise amplifier (LNA) or LNA input stage tuned to that reception band. The bandwidth of the LNA following the off-chip filter may be insufficient for simultaneous reception of channels at different reception bands. A separate LO signal having a different frequency is therefore needed for each reception band for signal downconversion. Each separate LO signal (I/Q) requires a separate analog and digital baseband/IF signal processing circuit. Inter-band carrier aggregation therefore requires parallel radio receivers, e.g., one receiver chain for each simultaneously utilized reception band.

Intra-band carrier aggregation refers to carrier aggregation where all wanted signal channels are within a single reception band, e.g., the passband of one off-chip RF filter. In contiguous intra-band carrier aggregation, there are at least two wanted signal channels and all wanted signal channels are adjacent or next to each other. In non-contiguous intra-band carrier aggregation, all wanted signal channels are not adjacent, e.g., there may be space in the frequency domain between some of the signal channels. There may also be blocking signals between wanted signal channels.

In intra-band carrier aggregation, a single off-chip RF filter and one LNA are generally sufficient because all wanted channels are within the passbands of the filter and LNA, e.g., two or more channels can be received using one RF IC input (single-ended or balanced). For example, assume $f_{BW,L}$ represents the RF bandwidth of the wanted signal channel at the lowest carrier frequency of $f_{C,L}$, and $f_{BW,H}$ represents the RF bandwidth of the wanted signal channel at the highest carrier frequency of $f_{C,H}$. The total bandwidth of the wanted signal may be represented by:

$$f_{BW,TOT} = f_{C,H} - f_{C,L} + (f_{BW,H} + f_{BW,L})/2. \tag{1}$$

It will be appreciated that there may be "empty" channels between the two mentioned channels. If $f_{BW,TOT}/2$ is less than or equal to the maximum available bandwidth of the baseband/IF analog and digital signal processing circuits of the receiver, the contiguous and non-contiguous intra-band carrier aggregation may be implemented with a single radio receiver utilizing only one LO signal. The different wanted channels are separated/detected in practice in the digital back-end.

If, however, $f_{BW,TOT}/2$ exceeds the maximum available bandwidth of the baseband/IF analog and digital signal processing circuits, a single receiver chain is not sufficient for contiguous or non-contiguous intra-band carrier aggregation. Further, if blocking signals, which can exist in the frequency bands between the non-contiguous wanted signal channels, have power levels that cannot be tolerated in the analog and/or digital signal processing circuits of the receiver, a single receiver chain is not sufficient for non-contiguous intra-band carrier aggregation. In these cases, the signal processing must be divided in the frequency domain into two or more parallel chains, which requires that the signal be downconverted in parallel I/Q mixers using at least two LO signals with different frequencies. As a result, the received signal must be divided into two or more parallel chains before being applied to the downconversion mixers.

A straightforward option is to use two parallel receiver ICs and connect them to the same RF input. Another option is to use two separate receivers on the same IC and connect them in parallel to the same RF input. Both examples require two parallel LNAs. Because LNAs typically use on-chip inductors, which require large silicon area, using two or more parallel LNAs requires a significant amount of silicon area. In addition, the RF input of the receiver IC has to be matched with sufficient accuracy to a specific impedance level, usually 50Ω, because the LNA input impedance affects the frequency response of the preceding off-chip RF filter. The LNA input has to be matched in all modes of operation, including when there is only one active LNA or when there are two or more parallel LNAs. In addition, the noise figure (NF) of all active LNAs must meet the same requirements, which sets the requirements for the minimum size and bias current of amplifying transistors of the LNAs. The requirements for sufficient input matching and NF regardless of the number of parallel LNAs means that the number of parallel devices connected to the RF input increases relative to the case where only one LNA is used in all modes of receiver operation. The higher number of parallel input devices means higher parasitic capacitances at the receiver RF input, which causes problems with input matching and/or the need for additional off-chip matching components. Using multiple parallel LNAs also significantly increases the supply current of the RF front-end. Thus, the use of parallel LNAs in parallel receivers is not desirable, especially if they use off- or on-chip inductors.

Another solution uses a single LNA capable of amplifying all wanted input signal channels in intra-band carrier aggregation, and then dividing the signal chain into two or more parallel signal processing chains. In the following it is assumed that the LNA is followed by a passive current-mode I/O downconversion mixer, and the resistive input impedance of the mixer forms part of the LNA load impedance. The division of one signal chain into two parallel chains may be implemented by connecting the inputs of two passive current-mode I/Q mixers to the LNA output. The use of parallel passive current-mode I/Q mixers maintains high linearity because highly linear circuit blocks are placed in parallel. However, when multiple passive I/Q mixers are connected to the LNA output, the LNA load impedance decreases relative to the case where only one I/Q mixer is connected to the LNA output. The LNA may use feedback from the node where the parallel I/Q mixers are connected. For example, when the LNA comprises a resistive-feedback LNA, the LNA performance parameters (like gain, input matching, and NF) may deteriorate. When another passive current-mode I/Q mixer is connected to the LNA output, the LNA output signal current is divided between the two parallel passive I/Q mixers, which means that the signal gain (or effective transconductance) provided by the RF front-end decreases, which leads to higher receiver NF. One way to address this problem is to increase the equivalent transconductance in the LNA, which in practice increases the LNA power consumption and/or the parasitic capacitances in the LNA. Unfortunately, larger parasitic capacitances may deteriorate the LNA input matching and NF, and lower the maximum frequency of operation. Moreover, the higher power consumption of such a solution is undesirable in portable devices.

Thus, alternate solutions are needed in the RF front-end for enabling intra-band carrier aggregation when processing the received signal requires using two or more separate LO signals with different frequencies.

SUMMARY

The method and apparatus described herein provide a solution that addresses the above-described problems associated with wireless receivers configured for conventional intra-band carrier aggregation. Broadly, the solution involves applying the received signal to a single front-end amplifier, which may comprise a low-noise amplifier, and dividing the amplified signal into two or more processing paths, where each path is associated with a different local oscillator frequency corresponding to a different reception channel or channels. To compensate for the impact of the additional processing paths on the amplifier performance, a negative resistor unit applies a negative resistance to the output of the front-end amplifier when two or more processing paths are active.

One exemplary embodiment provides a wireless receiver configured for intra-band carrier aggregation, where the receiver comprises a front-end amplifier, two or more processing chains, a negative resistor unit, and a selection unit. The front-end amplifier operates at one or more radio frequencies. The processing chains are connected in parallel at a common node, where the common node operatively connects to an output of the front-end amplifier, and wherein each of the two or more processing chains operate with a different local oscillator frequency. The negative resistor unit selectively operatively connects to the common node. The selection unit is configured to enable the negative resistor unit to apply a first negative resistance to the output of the front-end amplifier when two or more of the processing chains are active during a multiple frequency mode, where the multiple frequency mode is associated with multiple different local oscillator frequencies. During a single frequency mode, when only one of the two or more processing chains is active, the selection unit may further operatively disable the negative resistor unit such that the negative resistor unit does not affect the amplifier performance.

Another exemplary embodiment provides a method of controlling a gain of a wireless receiver configured for intra-band carrier aggregation, where the receiver includes a front-end amplifier operating at one or more radio frequencies, two or more processing chains connected in parallel at a common node, where the common node operatively connects to an output of the front-end amplifier and each of the processing chains operates with a different local oscillator frequency, and a negative resistor unit selectively operatively connected to the common node. The method comprises enabling the negative resistor unit when two or more of the processing chains are active in a multiple frequency mode to apply a first negative resistance to the output of the front-end amplifier, where the multiple frequency mode is associated with multiple different local oscillator frequencies. During a single frequency mode, when only one of the two or more processing chains is active, the method may further operatively disable the negative resistor unit such that the negative resistor unit does not affect the amplifier performance.

BRIEF DESCRIPTION OF THE DRAWINGS

FIGS. 5A-5C depict circuit diagrams for different exemplary implementations of the negative resistor unit of FIG. 1.

DETAILED DESCRIPTION

Figure 1:
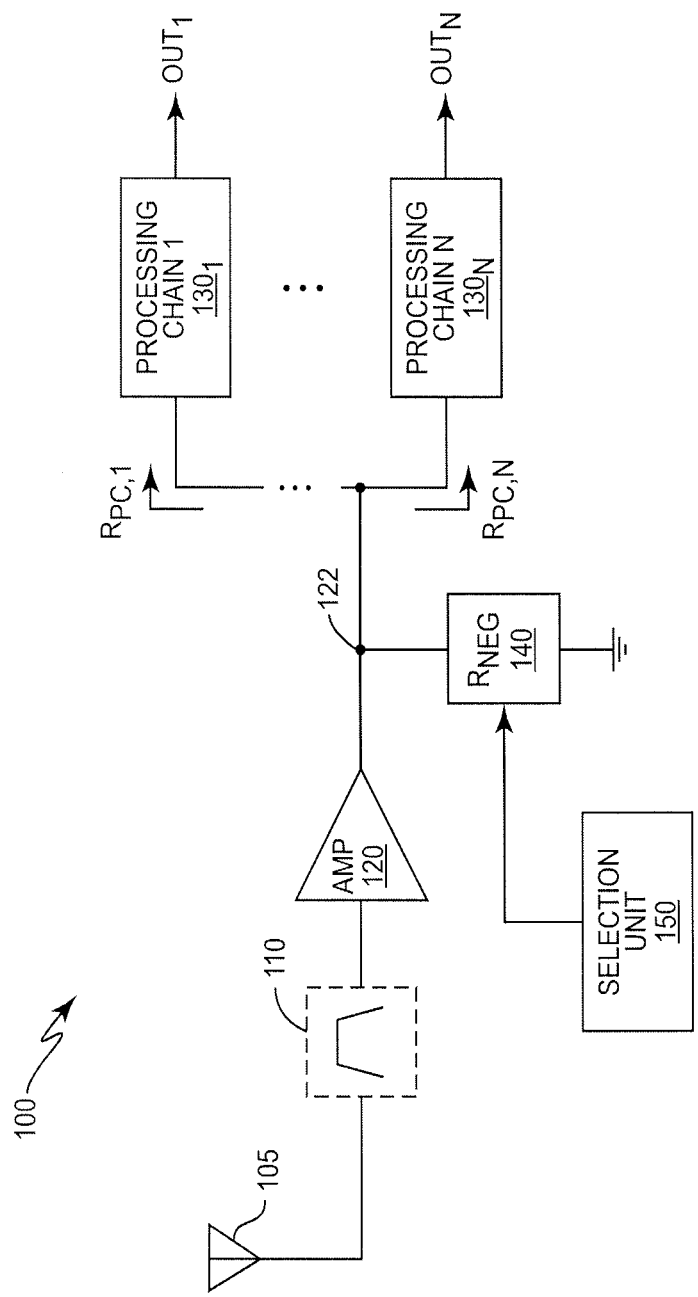
FIG. 1 depicts a block diagram of a wireless receiver according to one exemplary embodiment.

FIG. 1 depicts a wireless receiver 100 according to one exemplary embodiment. Receiver 100 incorporates a negative resistor unit 140 with a conventional receiver design to compensate for the amplifier gain loss that may occur when the receiver 100 uses multiple active processing chains associated with multiple different local oscillator frequencies for intra-band carrier aggregation.

Receiver 100 comprises an antenna 105, filter 110, RF front-end amplifier 120, a plurality of processing chains $130_1, \ldots 130_N$, generally referred to herein as processing chains 130, a negative resistor unit 140, and a selection unit 150. The antenna 105 and filter 110 are generally off-chip from the other receiver components, which are generally arranged on a single integrated circuit chip.

Filter 110 comprises a pre-selection filter 110 that pre-selects the received RF band from the signal received by antenna 105. RF front-end amplifier 120, which may comprise a low noise amplifier (LNA) operating at RF, amplifies the RF signal output by filter 110 for further processing in one or more of the processing chains 130. Amplifier 120 may be realized using any known implementation, including but not limited to, an inductively-degenerated common-source amplifier, resistively-feedback amplifier, etc. While not explicitly shown in FIG. 1, amplifier 120 may have differential inputs and outputs. A local oscillator 160 (FIG. 2) outputs a local oscillator signal for each processing chain 130. For example, a local oscillator 160 outputs $f_{LO1}$ to processing chain $130_1$. It will be appreciated that each processing chain 130 may have its own local oscillator 160, that a single local oscillator 160 may generate all of the different local oscillator signals for each processing chain 130, or that a single local oscillator 160 may generate the local oscillator signals for some of the processing chains, while one or more additional local oscillator(s) 160 may generate the local oscillator signal for the remaining processing chains 130. In any event, each active processing chain 130 outputs a different processed digital signal $OUT_n$ associated with a different local oscillator signal.

Figure 2:
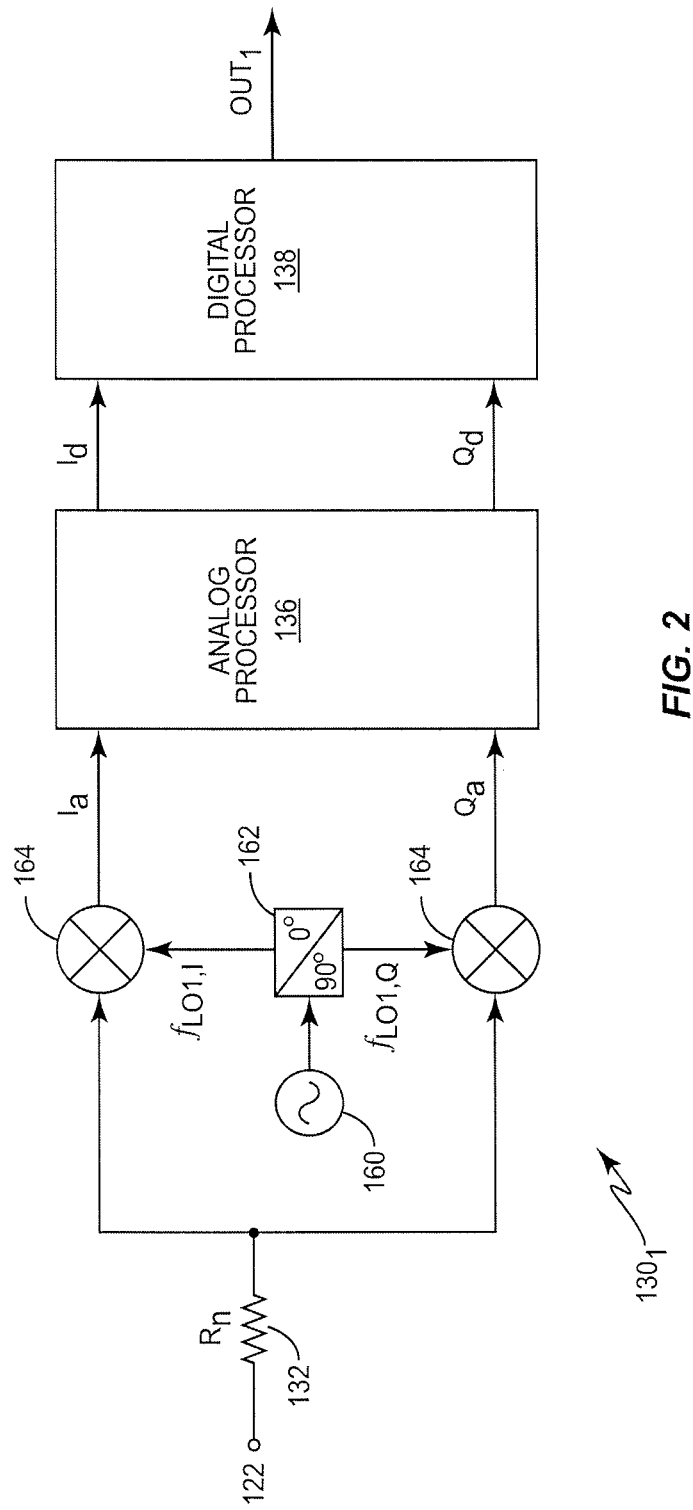
FIG. 2 depicts a block diagram for an exemplary processing chain.

While not explicitly shown in FIG. 1, it will be appreciated that each processing chain 130 may comprise an In-Phase and Quadrature path, which process the amplified RF signal to respectively generate a digital In-phase and Quadrature signal, e.g., at baseband or IF, responsive to the corresponding local oscillator frequency, and which are subsequently combined to generate a digital output signal $OUT_n$ for the corresponding processing chain, where n=1, 2, ... N FIG. 2 shows one exemplary processing chain 130 that may be used in receiver 100 comprising an optional resistor 132, In-phase and Quadrature mixers 164, analog processor 136, and digital processor 138. Local oscillator 160 outputs a local oscillator signal to phase shift unit 162, which generates Quadrature phases for the local oscillator signals of the Quadrature and In-phase processing chains such that $f_{LO,Q}$ provided to the Quadrature processing chain is 90° out-of-phase with $f_{LO,I}$ provided to the In-phase processing chain.

Figure 3B:
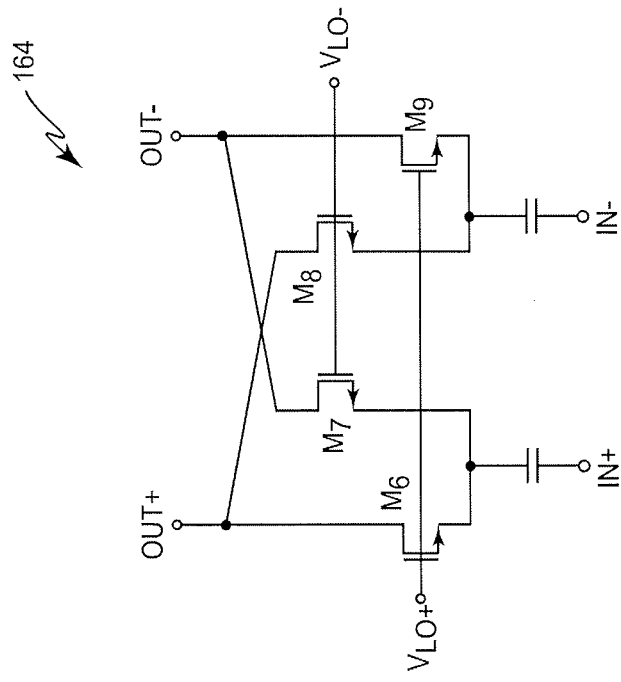
FIGS. 3A-3B depict exemplary mixers applicable for the processing chain of FIG. 2.
Figure 3A:
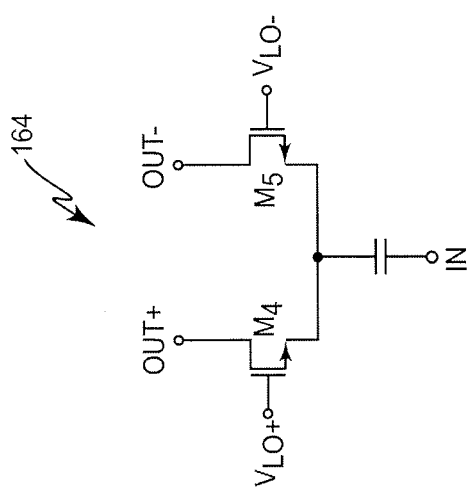
Figure 6:
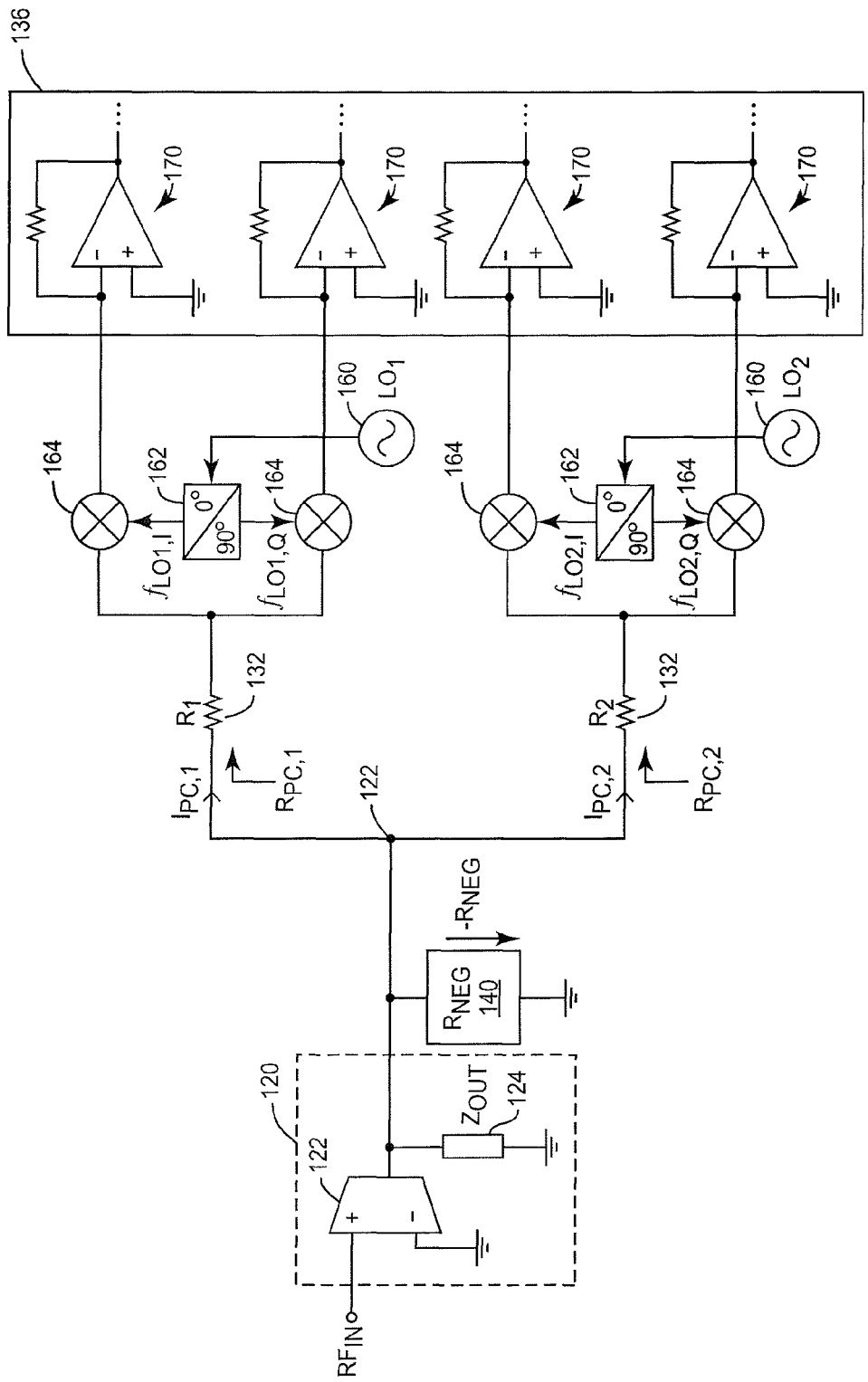
FIG. 6 depicts an exemplary circuit diagram for portions of one exemplary wireless receiver.

While not required, mixers 164 preferably comprise passive current-mode MOSFET mixers, which ideally produce no flicker noise and provide high linearity. While not explicitly shown in FIG. 2, mixers 164 may be followed by transimpedance amplifiers and/or buffers, e.g., as shown in FIG. 6, to provide proper current-mode mixing operation. FIGS. 3A and 3B depict exemplary passive current-mode MOSFET mixers 164, where the mixer 164 of FIG. 3A comprises a single-balanced passive current-mode MOSFET mixer and the mixer 164 of FIG. 3B comprises a double-balanced passive current-mode MOSFET mixer. While not explicitly shown in FIGS. 3A-3B, additional components are generally included after the passive current mode mixers 164 to facilitate proper current-mode mixing operation, e.g., transimpedance amplifiers and/or buffers at the output nodes.

The amplified In-phase ($I_a$) and Quadrature ($Q_a$) signals are applied to the analog processor 136, which processes the In-phase and Quadrature signals and converts the resulting I and Q analog signals to a digital In-phase signal $I_d$ and a digital Quadrature signal $Q_d$, e.g., at baseband or IF. Digital processor 138 digitally processes the digital In-phase and Quadrature signals to generate the output signal for that processing chain 130, e.g., $OUT_1$.

As previously mentioned, loading the amplifier output with two or more active parallel processing chains 130 decreases the amplifier load impedance relative to the case when the amplifier output is applied to only one active processing chain 130, which may deteriorate amplifier performance parameters, e.g., gain, input matching, noise figure, etc. More particularly, when more than one active processing chain 130 is connected to the amplifier output, the amplifier output signal current is divided between the multiple parallel processing chains 130, which reduces the gain or effective transconductance from the input of amplifier 120 to an output of down-conversion mixer 164, and therefore increases the noise figure. The selection unit 150 compensates for this effect by enabling the negative resistor unit 140 to add a negative resistance between the common node 122 connecting the input of the parallel processing chains 130 and ground when more than one of the processing chains 130 is active.

Figure 4:
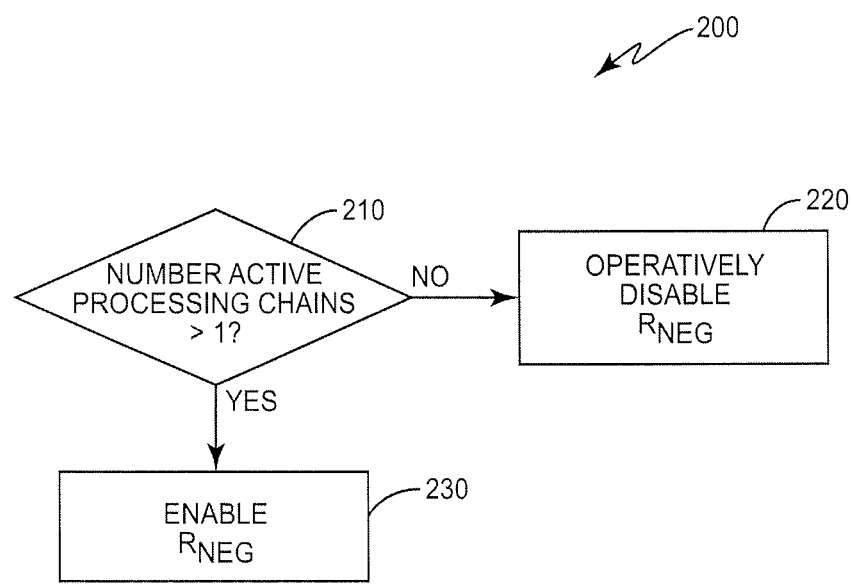
FIG. 4 depicts an exemplary method implemented by the wireless receiver of FIG. 1.

FIG. 4 shows an exemplary method 200 implemented by the selection 150. When the selection unit 150 determines more than one processing chain 130 is active for a multiple frequency mode (block 210), the selection unit 150 enables the negative resistor unit 140 to apply the desired negative resistance $R_{NEG}$ to the amplifier output (block 230), where the applied negative resistance is variable and depends on the number of active processing chains 130 and/or an effective input impedance of the additional processing chains 130. However, when the selection unit 150 determines only one processing chain 130 is active for a single frequency mode (block 210), the selection unit 150 operatively disables the negative resistor unit 140 (block 220).

As used herein, "operatively disable" refers to controlling the negative resistor unit 140 during the single frequency mode such that the negative resistor unit does not substantially affect the amplifier gain, noise figure, or other amplifier performance parameters. For example, the selection unit 150 may operatively disable the negative resistor unit 140 by disabling the negative resistor unit 140 such that no DC current flows through the negative resistor unit 140 and the negative resistor unit 140 has a negligible effect on the front-end amplifier performance. This embodiment has the additional advantage of providing power savings during the single frequency mode. Alternatively, the selection unit 150 may operatively disable the negative resistor unit 140 by enabling the negative resistor unit 140 such that the negative resistance applied to the amplifier output has a much higher absolute value than the negative resistance applied during the multiple frequency mode. For example, during the single frequency mode the negative resistor unit 140 may apply a negative resistance having an absolute value that is at least three times the absolute value of the negative resistance applied during the multiple frequency mode, or is at least 500Ω. According to still another embodiment, the selection unit 150 may operatively disable the negative resistor unit 140 by disconnecting the enabled negative resistor unit 140 from node 122 such that the negative resistor unit 140 connects to another amplifier connection point, e.g., an amplifier power supply. In this embodiment, the negative resistance may be the same or different than that associated with the multiple frequency mode.

The following provides additional details describing the effect of the negative resistor unit 140, e.g., in FIG. 1, when enabled. If the voltage at node 122 is $v_A$ and the current from node 122 to ground through negative resistor unit 140 is $i_{A,gnd}$, the resistance of negative resistor unit 140 may be represented by $-R_{NEG}=v_A/i_{A,gnd}<0\Omega$. When only one processing chain 130 is active, the impedance seen from the output of amplifier 120 may be represented by $R_{load}=R_{pc1}$, where $R_{pc1}$ represents the input impedance of processing chain $130_1$. However, when two processing chains 130 are active, the impedance seen from the output of amplifier 120 may be represented by the parallel combination $R'_{load}=R_{pc1}\|R_{pc2}\|(-R_{NEG})$, where $R_{pc2}$ represents the input impedance of processing chain $130_2$. It will be appreciated that $R_{pc1}$ does not need to equal $R_{pc2}$. If $-R_{NEG}=-R_{pc2}$, $R'_{load}=R_{load}$, which means that the amplifier performance (e.g., input matching, gain, etc.) stays relatively the same as compared to the single frequency mode, and the voltage gain from the RF input to the output of the processing chains 130 remains essentially the same. Similar logic applies when more than two processing chains 130 are active.

The implementation of a negative resistance requires active components. For example, FIGS. 5A-5C depict exemplary negative resistor units 140. FIGS. 5A and 5B depict a single-ended and differential implementation, respectively, using transconductance amplifiers. The negative resistor unit 140 of FIG. 5A comprises a single-ended transconductance amplifier configured in a feedback mode such that the $V_1$ node selectively couples to node 122. The input resistance of the circuit of FIG. 5A may be represented by $V_1/I_1=-1/g_m$. Thus, the circuit of FIG. 5A realizes a negative resistance when enabled, where the value of the negative resistance depends on, for example, the bias current, the sizes of the devices, e.g., the transistors and resistors, and the topology of the negative resistor circuit. FIG. 5B depicts a balanced differential circuit achieved when two transconductance amplifiers, e.g., those of FIG. 5A, are differentially connected, where the differential nodes ($V_{1+}$ and $V_{1-}$) connect to differential amplifier outputs. In this example, the input resistance may be represented by $V_1/I_1=(V_{1+}-V_{1-})/(I_{1+}-I_{1-})=-1/g_m$. The negative resistance of the negative resistor unit 140 is varied according to the number of active processing chains 130. This may be implemented, for example, by changing the value of a bias current or voltage in the negative resistor unit 140. Another option uses matrices of parallel- or series-connected devices instead of single devices in the negative resistor unit 140, and to switch on/off the devices in the component matrices to control the value of the negative resistance. It is also possible to use a negative resistor unit 140 comprising parallel negative resistor circuits, where the number of active negative resistor circuits depends on the number of active processing chains 130.

FIG. 5C depicts another exemplary negative resistor unit 140 comprising a cross-coupled common-source transistor stage ($M_1$, $M_2$) with resistive degeneration ($R_{S1}$, $R_{S2}$) to improve linearity. In this embodiment, the negative resistance is derived based on the transconductance of $M_1$ and $M_2$ and the resistances of the $R_{S1}$ and $R_{S2}$. It will be appreciated, however, that $R_{S1}$ and $R_{S2}$ are optional; when omitted the negative resistance is derived based on the transconductance of $M_1$ and $M_2$ at the expense of lower linearity. Resistors $R_{B1}$ and $R_{B2}$ comprise bias resistors set to a large value at the frequency of operation. In FIG. 5C, $V_B$ represents a bias voltage for the negative resistor unit 140, where $V_B$ is coupled to the gates of the transistors $M_1$, $M_2$ so as to enable/disable the negative resistor unit 140 and control the negative resistance. For example, the negative resistor unit 140 may be enabled by setting $V_B$ to a value greater than a threshold, and may be disabled by setting $V_B$ to a value less than the threshold, e.g., 0 V. While FIG. 5C shows an embodiment using a bias voltage to enable/disable the negative resistor unit 300, those skilled in the art will appreciate that any type of bias signal, e.g., a bias current, etc., could be used to enable/disable the negative resistor unit 140. When enabled, the negative resistance of the negative resistor unit 140 of FIG. 5C may be approximated as:

$$-R_{NEG} = -\left(\frac{1}{g_{m1}} + R_S\right) \approx -R_S, \quad (2)$$

where $g_{m1}$ represents the transconductance of transistor $M_1$, $R_S$ represents the value of degeneration resistors ($R_S=R_{S1}=R_{S2}$), and the approximation holds if $g_{m1}R_S \gg 1$. In this example, the absolute value of the resistance of the negative resistor unit 140 should track the input resistance of the mixer in the additional processing chain(s) 130, e.g., processing chain $130_2$ to minimize gain variations. In other words, when two processing chains are active, the negative resistor unit 140 should be configured such that the negative resistance generally equals the negative of one of the processing chain input impedances, e.g., $-R_{NEG}=-R_{pc,2}$ regardless of supply voltage, temperature, operational frequency, etc. If $R_{pc,2}$ depends mostly on the value of the resistors in series with mixer switching transistors, $R_{S1}$ and $R_{S2}$ should be implemented using the same resistor material. The bias voltage $V_B$ can be controlled in such a way that the effective amplifier transconductance $g_m$ also tracks the resistor material. Another possibility is to build a bias circuit that controls the value of $V_B$ in such a way that the value of $g_m$ tracks the on-resistance of the mixer switching transistors. The negative resistor unit 140 adds parasitic capacitance to the output of the front-end amplifier 120. If problematic, this parasitic capacitance may be tuned out at the frequency of interest, taking the LNA load inductor into account, by decreasing the amplifier load capacitance by the corresponding amount, if possible, and if not, by reducing the amplifier load inductance by a suitable amount to enable a higher total amplifier load capacitance.

FIG. 6 depicts exemplary circuit details for the amplifier and analog processor of the wireless receiver and processing chain of FIGS. 1 and 2. In this embodiment, a baseband amplifier couples to the output of each passive current-mode mixer 164, where the baseband amplifier comprises a transimpedance amplifier (TIA) 170 that uses operational amplifiers at analog baseband to realize a virtual ground at the mixer output, which may improve the linearity of mixer 164. The transimpedance amplifiers 170 are, for example, part of the analog processor 136.

The ability to selectively activate one or more processing chains 130 while maintaining the performance of the front-end amplifier 120 using a negative resistor unit 140 provides several advantages. First, the negative resistor unit 140 addresses the amplifier performance issues while consuming less current than conventional solutions, which generally have higher power consumption due to the increase in the amplifier transconductance. Further, the solution disclosed herein compensates for the addition of another processing chain 130 to the signal chain at the node where the addition occurs, which minimizes the number of circuit blocks that have to be modified between single and multiple frequency modes. Further still, the solution disclosed herein removes the need to implement additional configurability in the front-end amplifier 120. This is beneficial because the performance of the front-end amplifier 120 is sensitive to parasitic effects, e.g., parasitic capacitances, and adding more configurability to the amplifier 120 usually results in an increase in the number of transistors, which in turn increases the parasitic capacitances. This can affect, for example, the amplifier noise figure (NF), input matching, linearity, and available bandwidth of operation. In direct contrast, with the solution disclosed herein, the amplifier configuration remains the same in the single frequency mode and the multiple frequency mode. In addition, the solution disclosed herein may be used with any amplifier topology, for example, common-gate, inductively-degenerated common-source, and resistive-feedback amplifier topologies. Further still, the increase in the noise figure associated with the solution disclosed herein is insignificant. More particularly, the implementation of the solution disclosed herein slightly increases the noise figure and decreases the linearity, but the noise figure and linearity remain sufficient for practical applications, particularly when considered in light of the provided benefits. It will further be appreciated that the increase in silicon area associated with the solution disclosed herein is small.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless receiver configured for intra-band carrier aggregation, the receiver comprising:
a front-end amplifier operating at one or more radio frequencies;
two or more processing chains connected in parallel at a common node, said common node operatively connected to an output of the front-end amplifier, wherein each of said two or more processing chains operate with a different local oscillator frequency;
a negative resistor unit selectively operatively connected to the common node; and
a selection unit configured to enable the negative resistor unit to apply a first negative resistance to the output of the front-end amplifier when two or more of said processing chains are active during a multiple frequency mode, said multiple frequency mode associated with multiple different local oscillator frequencies.

2. The receiver of claim 1 wherein the selection unit is further configured to disable the negative resistor unit when only one of said two or more processing chains is active during a single frequency mode associated with a single local oscillator frequency.

3. The receiver of claim 1 wherein the selection unit is further configured to operatively disable the negative resistor unit when only one of said two or more processing chains is active during a single frequency mode associated with a single local oscillator frequency.

4. The receiver of claim 3 wherein the selection unit operatively disables the negative resistor unit by enabling the negative resistor unit such that a second negative resistance is applied to the output of the front-end amplifier, wherein an absolute value of said second negative resistance is sufficiently larger than an absolute value of the first negative resistance such that the second negative resistance has a negligible effect on a gain of the front-end amplifier.

5. The receiver of claim 4 wherein the absolute value of the second negative resistance is at least three times greater than the absolute value of the first negative resistance.

6. The receiver of claim 4 wherein the absolute value of the second negative resistance is greater than or equal to 500Ω.

7. The receiver of claim 3 wherein the selection unit operatively disables the negative resistor unit by disconnecting the negative resistor unit from the common node and connecting the negative resistor unit to an alternate connection point in the front-end amplifier.

8. The receiver of claim 7 wherein the alternate connection point comprises an amplifier power supply.

9. The receiver of claim 1 wherein the negative resistance of the enabled negative resistor unit is variable and depends on the number of processing chains.

10. The receiver of claim 1 wherein each processing chain comprises:
an I/Q mixer configured to downconvert a radio frequency signal at the output of the front-end amplifier responsive to a corresponding local oscillator frequency to generate analog In-phase and Quadrature signals at corresponding intermediate or baseband frequencies;
an analog signal processor configured to process the analog In-phase and Quadrature signals at the corresponding intermediate or baseband frequencies to generate digital In-phase and Quadrature signals; and
a digital signal processor configured to process the digital In-phase and Quadrature signals.

11. The receiver of claim 10 wherein each I/Q mixer comprises a passive current-mode MOSFET mixer.

12. The receiver of claim 10 wherein each analog signal processor comprises a transimpedance amplifier operatively coupled to an output of the corresponding I/Q mixer and configured to form a virtual ground or low impedance termination at the output of the corresponding I/Q mixer.

13. The receiver of claim 1 wherein the first negative resistance compensates for changes in an effective load impedance of the front-end amplifier when applied to the output of the front-end amplifier during the multiple frequency mode, such that the gain of the front-end amplifier in the multiple frequency mode generally equals the gain of the front-end amplifier in a single frequency mode.

14. The receiver of claim 1 wherein the negative resistor unit comprises one of a single-ended negative resistor configuration and a differential negative resistor configuration.

15. The receiver of claim 14 wherein the differential negative resistor configuration comprises cross-coupled common source transistors, each having a transconductance, and each controlled by a bias input to each gate of the common source transistors, and wherein the negative resistance of the enabled negative resistor unit is derived based on the transconductances of the common-source transistors.

16. The receiver of claim 15 wherein the differential negative resistor configuration further comprises one or more degeneration resistors coupled to the source of each transistor, wherein the negative resistance of the enabled resistor unit is further derived based on the resistances of the one or more degeneration resistors.

17. The receiver of claim 15 wherein the selection unit is configured to enable the negative resistor unit to apply the first negative resistance by setting the bias to a first value greater than a threshold.

18. The receiver of claim 1 wherein the receiver is configured for one of contiguous intra-band carrier aggregation and non-contiguous intra-band carrier aggregation.

19. The receiver of claim 1 wherein the front-end amplifier comprises a low-noise amplifier.

20. A method of controlling a gain of a wireless receiver configured for intra-band carrier aggregation, said receiver comprising a front-end amplifier operating at one or more radio frequencies, two or more processing chains connected in parallel at a common node, said common node operatively connected to an output of the front-end amplifier and each of said two or more processing chains configured to operate with a different local oscillator frequency, and a negative resistor unit selectively operatively connected to the common node, the method comprising:

determining whether the receiver is configured for a single frequency mode associated with a single local oscillator frequency or a multiple frequency mode associated with multiple local oscillator frequencies; and enabling the negative resistor unit when two or more of the processing chains are active for the multiple frequency mode to apply a first negative resistance to the output of the front-end amplifier, each of said multiple different local oscillator frequencies of the multiple frequency mode associated with a different one of the active processing chains.

21. The method of claim 20 further comprising disabling the negative resistor unit when only one of the two or more processing chains is active for the single frequency mode, wherein the single local oscillator frequency is associated with the active processing chain.

22. The receiver of claim 20 further comprising operatively disabling the negative resistor unit when only one of said two or more processing chains is active during the single frequency mode associated with a single local oscillator frequency.

23. The receiver of claim 22 wherein operatively disabling the negative resistor unit comprises enabling the negative resistor unit such that a second negative resistance is applied to the output of the front-end amplifier, wherein an absolute value of said second negative resistance is sufficiently larger than an absolute value of the first negative resistance such that the second negative resistance has a negligible effect on a gain of the front-end amplifier.

24. The receiver of claim 23 wherein the absolute value of the second negative resistance is at least three times greater than the absolute value of the first negative resistance.

25. The method of claim 23 wherein the absolute value of the second negative resistance is greater than or equal to 500 $\Omega$.

26. The method of claim 22 wherein operatively disabling the negative resistor unit comprises disconnecting the negative resistor unit from the common node and connecting the negative resistor unit to an alternate connection point in the front-end amplifier.

27. The method of claim 26 wherein the alternate connection point comprises an amplifier power supply.

28. The method of claim 20 further comprising setting the negative resistance of the negative resistor unit based on the number of active processing chains.

29. The method of claim 20 further comprising setting the negative resistance of the negative resistor unit based on an effective input impedance of the multiple active processing chains.

30. The method of claim 20 wherein each processing chain is configured to:

downconvert the radio frequency signal at the output of the front-end amplifier responsive to a corresponding local oscillator frequency to generate analog In-phase and Quadrature signals at corresponding intermediate or baseband frequencies in an I/O mixer;

process the analog In-phase and Quadrature signals at the corresponding intermediate or baseband frequencies to generate digital In-phase and Quadrature signals in an analog signal processor;

process the digital In-phase and Quadrature signals in a digital signal processor; and the method further comprising configuring the analog signal processor to form a virtual ground or low impedance termination at the output of the corresponding I/Q mixer.

31. The method of claim 20 wherein enabling the negative resistor unit comprises enabling the negative resistor unit such that the negative resistance compensates for changes in an effective load impedance of the front-end amplifier when the second or additional one of the two or more of the processing chains are active such that the gain of the front-end amplifier in the multiple frequency mode generally equals the gain of the front-end amplifier in the single frequency mode.

32. The method of claim 20 wherein the negative resistor unit comprises a pair of cross-coupled common-source transistors controlled by a bias input to each gate of the common source transistors, wherein enabling the negative resistor unit comprises setting the bias to a first value greater than a threshold.

33. The method of claim 20 wherein the receiver is configured for one of contiguous intra-band carrier aggregation and non-contiguous intra-band carrier aggregation.

\* \* \* \* \*